US008571938B2

(12) United States Patent
Zingsheim

(10) Patent No.: US 8,571,938 B2
(45) Date of Patent: Oct. 29, 2013

(54) UPDATING DYNAMIC INFORMATION WITHIN AN INTELLIGENT CONTROLLER UTILIZING A SMART CARD

(75) Inventor: Jeffrey S. Zingsheim, Franklin, WI (US)

(73) Assignee: Honeywell International Inc., Morristown, NJ (US)

(*) Notice: Subject to any disclaimer, the term of this patent is extended or adjusted under 35 U.S.C. 154(b) by 775 days.

(21) Appl. No.: 11/877,246

(22) Filed: Oct. 23, 2007

(65) Prior Publication Data
US 2009/0106116 A1 Apr. 23, 2009

(51) Int. Cl.
G06Q 20/00 (2012.01)
(52) U.S. Cl.
USPC .................. 705/17; 705/13; 705/41; 705/44; 705/64; 705/65; 235/383; 235/381; 235/492; 235/486
(58) Field of Classification Search
USPC .......................................................... 705/17
See application file for complete search history.

(56) References Cited

U.S. PATENT DOCUMENTS

| 5,566,327 | A | * | 10/1996 | Sehr ....................................... 1/1 |
| 5,920,629 | A | * | 7/1999 | Rosen ............................. 705/69 |
| 6,003,014 | A | * | 12/1999 | Lee et al. ......................... 705/13 |
| 6,394,343 | B1 | * | 5/2002 | Berg et al. ..................... 235/379 |
| 6,718,314 | B2 | * | 4/2004 | Chaum et al. ................... 705/64 |
| 7,086,584 | B2 | | 8/2006 | Stoutenburg et al. |
| 2002/0116344 | A1 | * | 8/2002 | Kinoshita et al. .............. 705/65 |
| 2002/0145051 | A1 | * | 10/2002 | Charrin ......................... 235/492 |
| 2002/0194137 | A1 | * | 12/2002 | Park et al. ....................... 705/64 |
| 2003/0085272 | A1 | * | 5/2003 | Andrews et al. .............. 235/380 |
| 2005/0222961 | A1 | * | 10/2005 | Staib et al. ...................... 705/64 |
| 2005/0261816 | A1 | | 11/2005 | DiCroce et al. |

OTHER PUBLICATIONS

An Introduction to EMV, The Smart Card Industry Standard, Ingenico North America, 2001.*
http://web.archive.org/web/20060828120003/www.honeywellaccess.c.*

* cited by examiner

Primary Examiner — Fateh Obaid
(74) Attorney, Agent, or Firm — Husch Blackwell

(57) ABSTRACT

A system for updating a control device includes a user's portable programmable media having a data storage device, and a primary controlling device including a computer having a data storage device for storing data. A primary reader/writer communicates with the primary controlling device, and the primary reader/writer transfers control data and transactional data from the primary data storage device to the user's portable programmable media. A secondary controlling device includes a secondary computer and a secondary data storage device for storing data. A secondary reader/writer communicates with the secondary controlling device and reads the control and transactional data included in the user's portable programmable media, transferring the data to the secondary controlling device for authenticating, completing a transaction, and storing at least part of the data in the secondary data storage device.

17 Claims, 3 Drawing Sheets

UPDATING DYNAMIC INFORMATION WITHIN AN INTELLIGENT CONTROLLER UTILIZING A SMART CARD

FIELD OF THE INVENTION

The present invention relates to a system for updating a control device, and more specifically, a system for updating a control device having a computer using portable programmable media.

BACKGROUND OF THE INVENTION

Currently, portable programmable media such as smart cards are used in commercial applications, for example, as a debit card which may contain the account balance of the card holder. The account balance is physically updated either at a designated kiosk or via a special-use card reader/writer. The account balance may then be debited by an off-line point-of-sale (POS) device. Information such as exchange rates, prices of dispensed goods, etc. which are stored within online POS devices may be updated remotely either via a wide-area public or private computer network (such as the Internet), or via an as-needed telephone modem connection, whereas an off-line device (i.e. one that has no remote network or telephone modem access) must be physically updated using a computer or other local interface mechanism.

Similarly, typical point of entry systems to a secure area, for example, a door or building security system, may require a communication link such as a network to update security criteria. For a point of entry off-line system, updates must be made manually using a computer or other local interface mechanism.

Therefore, a need exists for a system and method for increasing the efficiency and frequency of updates to an off-line system, such as a POS device or point of entry security device.

SUMMARY OF THE INVENTION

In an aspect of the invention a system for updating a control device includes a portable programmable medium including a data storage device. A primary control device including a primary computer and a primary data storage device for storing data. A primary reader/writer communicating with the primary control device, the primary reader/writer transferring transactional data for a first transaction and control data from the primary data storage device to the portable programmable medium. A secondary control device including a secondary computer and a secondary data storage device for storing data. A secondary reader/writer communicating with the secondary control device. The secondary reader/writer transferring the control data from the portable programmable medium to the secondary control device and storing the control data in the secondary data storage device. The secondary reader/writer may also transfers transactional data for a second transaction using the secondary control device. Further, the control data may update existing data in the data storage device of the secondary control device. The secondary control device may also be part of a point of sale (POS) device. Moreover, the primary control device may manage a financial transaction.

In a related aspect, the primary and secondary control devices manage points of entry into a secure area.

In a related aspect, the primary control device communicates with a remote device for providing data to the primary control device. Further, the primary control device may communicate with the remote device using a wireless or wired communications link. The specified data on the portable programmable media may be received from a financial institution communicating with the primary control device via a network. The secondary control device may also be a stand-alone device not communicating with a remote device. The portable programmable media may also include a processor.

In a related aspect, the primary control device communicates with a remote device using a network communications link, and the secondary control device is a stand-alone device not communicating with the remote device. The control data may include exchange rate and/or pricing tables. The transactional data may also include personal data of a user including a current card balance and/or bank account balance.

In another aspect of the invention, a method for updating a control device includes the steps of: providing data storage in a portable programmable medium; presenting the medium to a primary reader/writer communicating with a primary control device; reading the portable programmable medium using the primary reader/writer; transferring transactional data for a first transaction and control data from the primary control device to the portable programmable medium; presenting the portable programmable medium to a secondary reader/writer communicating with a secondary control device; reading the portable programmable medium using the secondary reader/writer; and transferring the control data from the portable programmable medium to the secondary control device. The method may further include transferring transactional data for a second transaction using the secondary control device. The method also may include after the presenting of the portable programmable medium to the primary reader/writer and the secondary reader/writer, authenticating personal data on the portable programmable medium. The method may also include the control data received from the primary control device which includes exchange rate and/or pricing tables. The method may further include the transactional data received from the primary control device including a current card balance and/or bank account balance.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
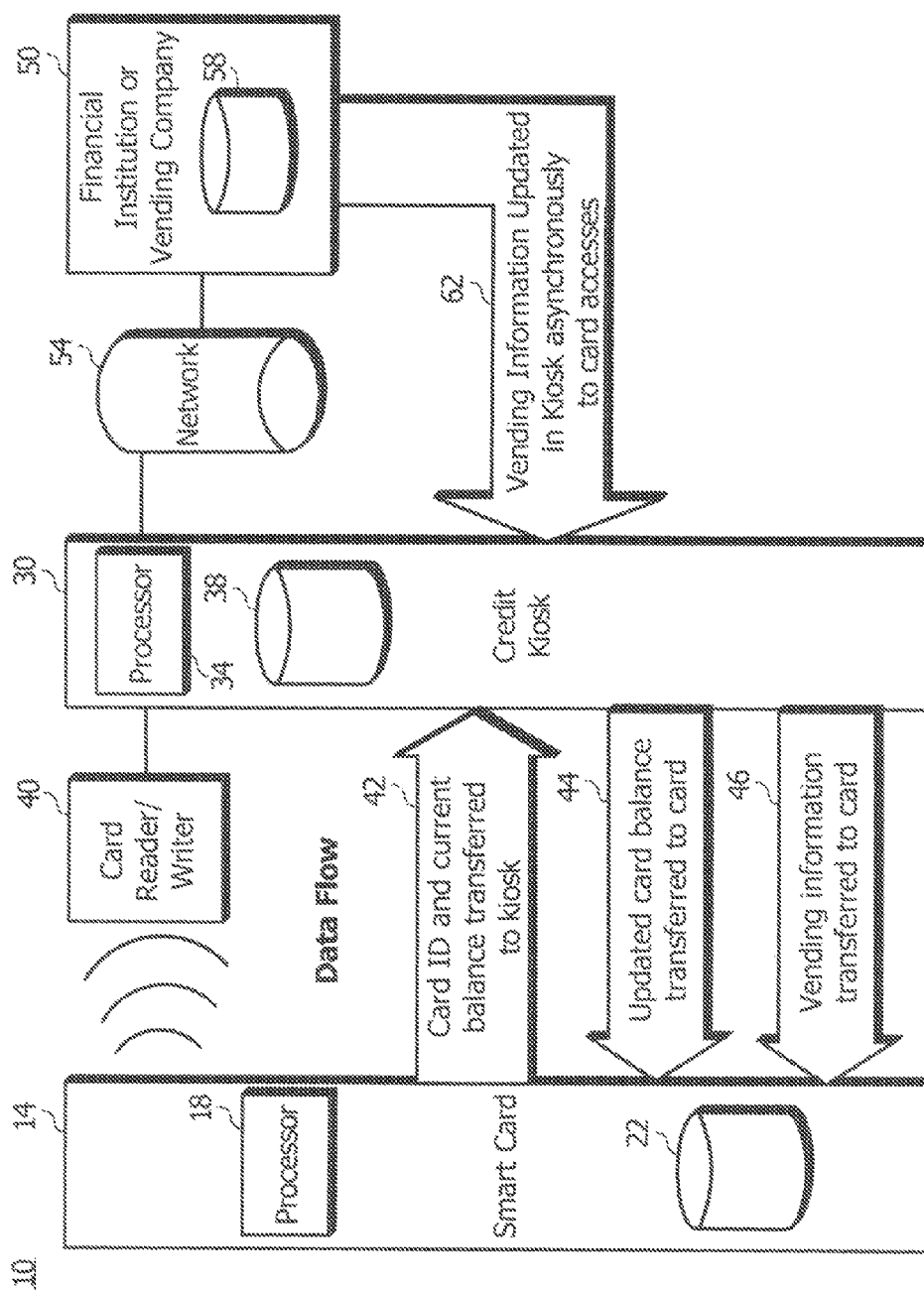
FIG. 1 is a block diagram depicting a system for updating a control device according to an embodiment of the invention including a smart card, and an on-line point of service (POS) device communicating with a financial institution.
Figure 2:
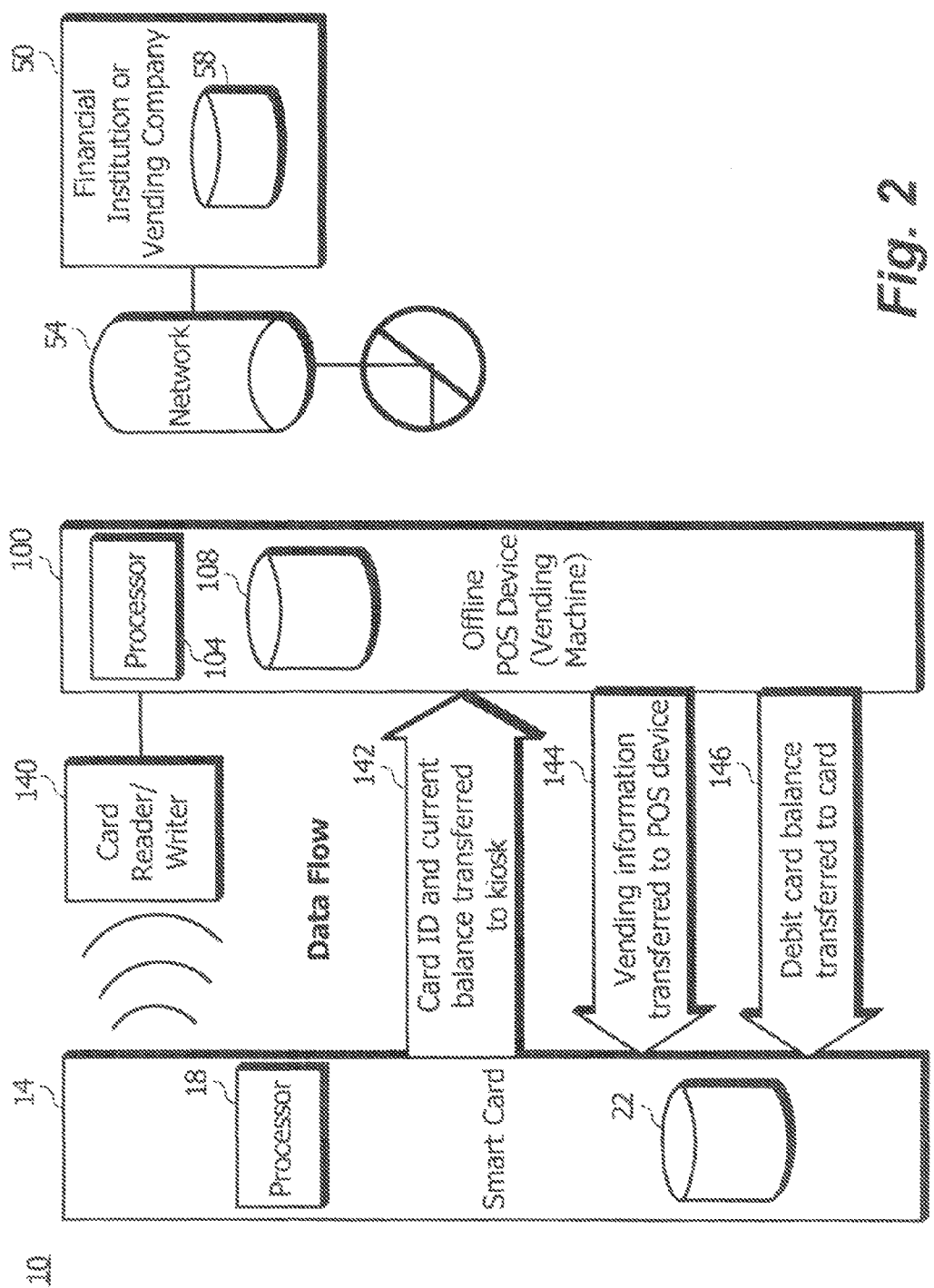
FIG. 2 is a block diagram depicting the smart card shown in FIG. 1, being used to update an off-line POS device.
Figure 3:
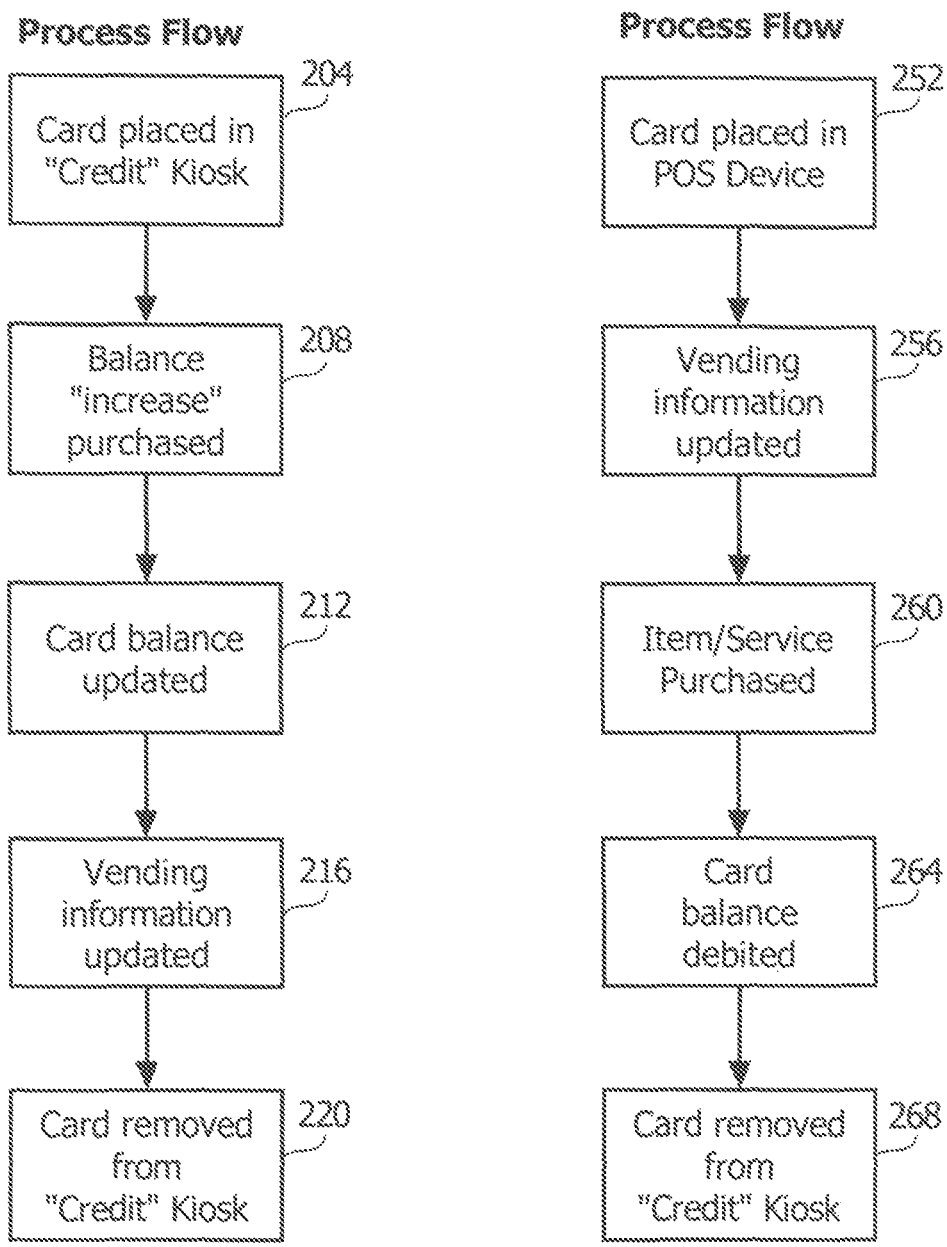
FIG. 3 is a flow chart depicting the steps pertaining to the embodiment of the invention shown in FIGS. 1 and 2.

An illustrative embodiment of a system 10 for updating a control device according to the present invention is shown in FIGS. 1-3 and includes a user's portable programmable media embodied as a smart card 14. The smart card 14 includes a processor 18 and a data storage device 22. The card 14 includes a card identification (ID) managed by the processor 18 and used for authentication of the card, and thereby, the user presenting the card. Alternatively, a portable programmable media embodied as a card having a magnetic strip may be used or, for example, a universal serial bus (USB) memory device or a cell phone. A primary control device embodied as a credit kiosk 30 is connected to a primary reader/writer 40. The credit kiosk 30 includes a processor or computer 34 and a data storage device 38. The primary reader/writer 40 is adapted to read the smart card 14 and enable the credit kiosk 30 to authenticate the card 14 by reading the card identification. When the card 14 is determined to be valid, the credit kiosk 30 initiates a transaction using the computer 34 in combination with a remote control device embodied as a financial institution or vending company 50 via a network 54. The network 54 may be wired or wireless and use any known communication hardware and software. The financial institution 50 includes data storage 58, which includes transactional data for the user, such as, personal user data including a current card balance and/or bank account balance, and also includes control data for the control device to complete the transaction such as exchange rates and/or pricing tables. Alternatively, the remote control device may be part of a vending company which supplies and maintains products in vending machines. For a vending company, changing prices to reflect discounts or sales is necessary, for example, when adding new products or promoting exiting products. The financial institution or vending company 50 communicates and transfers data 62 via the network 54 to the credit kiosk 30. The data is transferred asynchronously in relation to the card accessing the credit kiosk 30 data. The primary reader/writer 40 communicates with the primary control device 30 to transfer data 44, 46 to the data storage device 22 on the smart card 14. The data includes, for example, updated card balance 44 and vending information 46.

Referring to FIG. 2 where like elements have the same reference numerals as in FIG. 1, a secondary control device embodied as an offline point of sale (POS) device or vending machine 100 is connected to a secondary reader/writer 140. The POS 100 includes a processor or computer 104 and a data storage device 108. The secondary reader/writer 140 is adapted to read the smart card 14 which enables the POS 100 to authenticate the card 14 using the computer 104 by reading the card identification (ID) and transferring 142 the card ID to the POS 100. When the card 14 is determined to be valid, the POS device 100 initiates a local transaction determined by the user's selection because the POS device is a stand-alone or off-line device, i.e., not communicating with the financial institution 50. Transfer of the data received from the credit kiosk 30 is also communicated 144 to the data storage device 108 of the POS device 100 using the computer 104. The data transferred to the POS device 100 includes control data and transactional data pertaining to the present transaction and user, for example, the control data may include exchange rate and/or pricing tables, and the transactional data may include personal user data including a current card balance and/or bank account balance. Data is also transferred 146 to the card 14 which may include, for example, the card 14 balance following the transaction.

In operation and referring to FIGS. 1 and 3, a user may initiate a transaction which includes, for example, placing the card 14 in the primary reader/writer 40 of the credit kiosk 30 at step 204 (shown in FIG. 3) while purchasing a credit increase in step 208, for example, adding value to a transit card or other type of pre-paid card. Alternatively, the card 14 may also be, for example, swiped or waved in front of a corresponding reader/writer. In another embodiment, an item may be purchased using, for example, a credit card or debit card using the credit kiosk 30. After which, the card 14 balance is updated at step 212 and the kiosk 30 data/information is also updated at step 216 by the financial institution 50. Then, the card 14 is removed at step 220 from the primary reader/writer 40.

Referring to FIGS. 2 and 3, the transaction includes placing the card 14 in the secondary reader/writer 140 of the POS device 100 at step 252. The reader/writer transfers data to the data storage device 108 of the POS 100 at step 256 thereby updating data in the POS device 100 while purchasing an item at step 260. After which, the card 14 balance is updated at step 264 and the card 14 removed at step 268 from the secondary reader/writer 140.

In another embodiment, the primary and secondary control devices 30, 100 may manage a point of entry to a secure area. Data updated and/or retrieved from an on-line point of entry system, such as a door or building security, may be transferred to an off-line system via the user's card in the same manner as with the financial information of the embodiment of FIGS. 1-3. The data transferred may be particular to the user or other users, such as updated user access criteria which may include times of authorized entry or the like, or non-user information pertaining to the point of entry system, such as software upgrades.

Thus, a smart card 14 used by a card holder who recently accessed an online kiosk or POS device transfers information to an offline POS device, such as exchange rates, or prices (or multipliers) of dispensed goods. An advantage of the invention is the elimination of the need for a technician to visit an off-line POS device to update information.

The invention may apply to multiple business areas, for example, access control, security, or transportation (buses, trains, taxis, etc.), as well as, commercial point of sale (POS) devices such as vending machines.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A system for updating a control device of a security system, comprising:
   a portable programmable medium including a data storage device;
   a primary control device including a primary computer and a primary data storage device for storing data of the security system, the primary control device managing transactions;
   a primary reader/writer communicating with the primary control device, the primary reader/writer and primary control device authenticating the portable programmable medium via a card identifier read from the portable programmable medium, the primary reader/writer transferring transactional data for a first transaction and control data from the primary data storage device to the portable programmable medium, the transactional data and the control data being received by the primary control device from a remote device communicating with the primary control device via a network;
   a secondary control device that controls access through a point of entry of the security system, the secondary control device including a secondary computer and a secondary data storage device for storing data; and
   a secondary reader/writer communicating with the secondary control device, the secondary reader/writer and secondary control device authenticating the portable programmable medium via the card identifier read from the portable programmable medium, the secondary reader/writer transferring the control data from the portable programmable medium to the secondary control device and storing the control data in the secondary data storage device, wherein the control data updates existing data in the data storage device of the secondary control device, and the secondary control device is a stand-alone device not communicating with the remote device and wherein the update to the existing data changes a processing feature of the secondary control device and conditions of access by an authorized user of the portable medium or by other users through the point of entry controlled by the secondary control device, wherein the update to the secondary control device from the portable programming medium eliminates a need for a technician to visit the secondary control device to update the conditions of access.

2. The system of claim 1, wherein the secondary reader/writer transfers transactional data for a second transaction using the secondary control device.

3. The system of claim 1, wherein the secondary control device is part of a point of sale (POS) device.

4. The system of claim 1, wherein the primary control device manages a financial transaction.

5. The system of claim 1, wherein the primary and secondary control devices manage points of entry into a secure area.

6. The system of claim 1, wherein the primary control device communicates with the remote device using a wireless or wired communications link.

7. The system of claim 1, wherein the transactional data and the control data on the portable programmable media is received from a financial institution communicating with the primary control device via the a network.

8. The system of claim 1, wherein the portable programmable media includes a processor.

9. The system of claim 1, wherein the control data includes exchange rate and/or pricing tables.

10. The system of claim 1, wherein the transactional data includes personal data of a user including a current card balance and/or bank account balance.

11. A method for updating a control device of a security system, comprising:

providing data storage in a portable programmable medium;

presenting the medium to a primary reader/writer communicating with a primary control device of the security system;

reading the portable programmable medium using the primary reader/writer;

the primary reader/writer and primary control device authenticating the portable programmable medium via a card identifier read from the portable programmable medium;

transferring transactional data for a first transaction and control data from the primary control device to the portable programmable medium, the transactional data and the control data being received by the primary control device from a remote device communicating with the primary control device via a network;

presenting the portable programmable medium to a secondary reader/writer communicating with a secondary control device that controls access through a point of entry of the security system, the secondary control device being a stand-alone device not communicating with the remote device;

reading the portable programmable medium using the secondary reader/writer;

the secondary reader/writer and secondary control device authenticating the portable programmable medium via the card identifier read from the portable programmable medium; and transferring the control data from the portable programmable medium to the secondary control device wherein the control data updates existing data in the data storage device of the secondary control device and wherein the updated existing data changes a processing feature of the secondary control device and conditions of access by an authorized user of the portable medium or by other users through the point of entry controlled by the secondary control device wherein the update to the secondary control device from the portable programming medium eliminates a need for a technician to visit the secondary control device to update the conditions of access.

12. The system of claim 11, further including transferring transactional data for a second transaction using the secondary control device.

13. The method of claim 11, further including after the presenting of the portable programmable medium to the primary reader/writer and the secondary reader/writer:

authenticating personal data on the portable programmable medium.

14. The method of claim 11, wherein the control data received from the primary control device includes exchange rate and/or pricing tables.

15. The method of claim 11, wherein the transactional data received from the primary control device includes a current card balance and/or bank account balance.

16. The system of claim 1, wherein the remote device is a control device for a security system.

17. The system of claim 1, wherein the primary and secondary control devices manage points of entry into a secure area, and the remote device is a control device for a security system.

* * * * *